(12) United States Patent
Winefordner et al.

(10) Patent No.: US 10,479,431 B2
(45) Date of Patent: Nov. 19, 2019

(54) ADJUSTABLE HEIGHT SEAT POST

(71) Applicant: Crank Brothers, Inc., Laguna Beach, CA (US)

(72) Inventors: Carl Winefordner, Laguna Beach, CA (US); Frank Hermansen, Laguna Beach, CA (US)

(73) Assignee: CRANK BROTHERS, INC., Laguna Beach, CA (US)

( * ) Notice: Subject to any disclaimer, the term of this patent is extended or adjusted under 35 U.S.C. 154(b) by 155 days.

(21) Appl. No.: 15/543,429

(22) PCT Filed: Jan. 13, 2016

(86) PCT No.: PCT/IB2016/050131
§ 371 (c)(1),
(2) Date: Jul. 13, 2017

(87) PCT Pub. No.: WO2016/113673
PCT Pub. Date: Jul. 21, 2016

(65) Prior Publication Data
US 2018/0001953 A1    Jan. 4, 2018

(30) Foreign Application Priority Data
Jan. 13, 2015   (IT) .............................. VR2015A0006

(51) Int. Cl.
*B62J 1/08*      (2006.01)
*B62J 99/00*     (2009.01)

(52) U.S. Cl.
CPC ................. *B62J 99/00* (2013.01); *B62J 1/08* (2013.01); *B62J 2001/085* (2013.01); *B62J 2099/004* (2013.01); *B62J 2099/0046* (2013.01)

(58) Field of Classification Search
CPC ........ B62J 99/00; B62J 1/08; B62J 2001/085; B62J 2099/044; B62J 2099/0046
(Continued)

(56) References Cited

U.S. PATENT DOCUMENTS 8,308,124 B2    11/2012  Hsu
8,398,104 B2 *   3/2013  Hsu ........................... B62J 1/08
                                                       267/117
(Continued)

FOREIGN PATENT DOCUMENTS

EP          2657113         10/2013
EP          2657113 A3 *   10/2014   ................ B62J 1/08

OTHER PUBLICATIONS

International Search Report for PCT/IB2016/050131 dated Mar. 17, 2016 (two pages).

*Primary Examiner* — Jacob D Knutson
(74) *Attorney, Agent, or Firm* — Tutunjian & Bitetto, P.C.

(57) ABSTRACT

An adjustable height seat post including supporting means connectable to a bicycle frame, a quill associated with said supporting means and having a head suitable to clamp rails of a bicycle saddle, hydraulic adjusting means, associated with said supporting means, for lifting or lowering said quill in a desired position selected by the user, said hydraulic adjusting means including a cylindrical chamber inside which a piston assembly is foreseen, and valve means, suitable to selectively open or close an hydraulic path through said piston assembly for selectively lock or unlock the position of said piston assembly relative to said cylindrical chamber, and the valve means comprise at least a valve body, associated with said piston assembly, which is selectively rotatable from an open position, in which the hydraulic path is open, to a closed position in which the hydraulic path is closed.

17 Claims, 10 Drawing Sheets

(58) Field of Classification Search
USPC .................................................. 280/281.1
See application file for complete search history.

(56) References Cited

U.S. PATENT DOCUMENTS

| | | | |
|---|---|---|---|
| 9,963,181 B2* | 5/2018 | Madau | B62J 1/08 |
| 2012/0104727 A1* | 5/2012 | Hsu | B62J 1/08 |
| | | | 280/287 |
| 2014/0208933 A1 | 7/2014 | Kuo | |

* cited by examiner

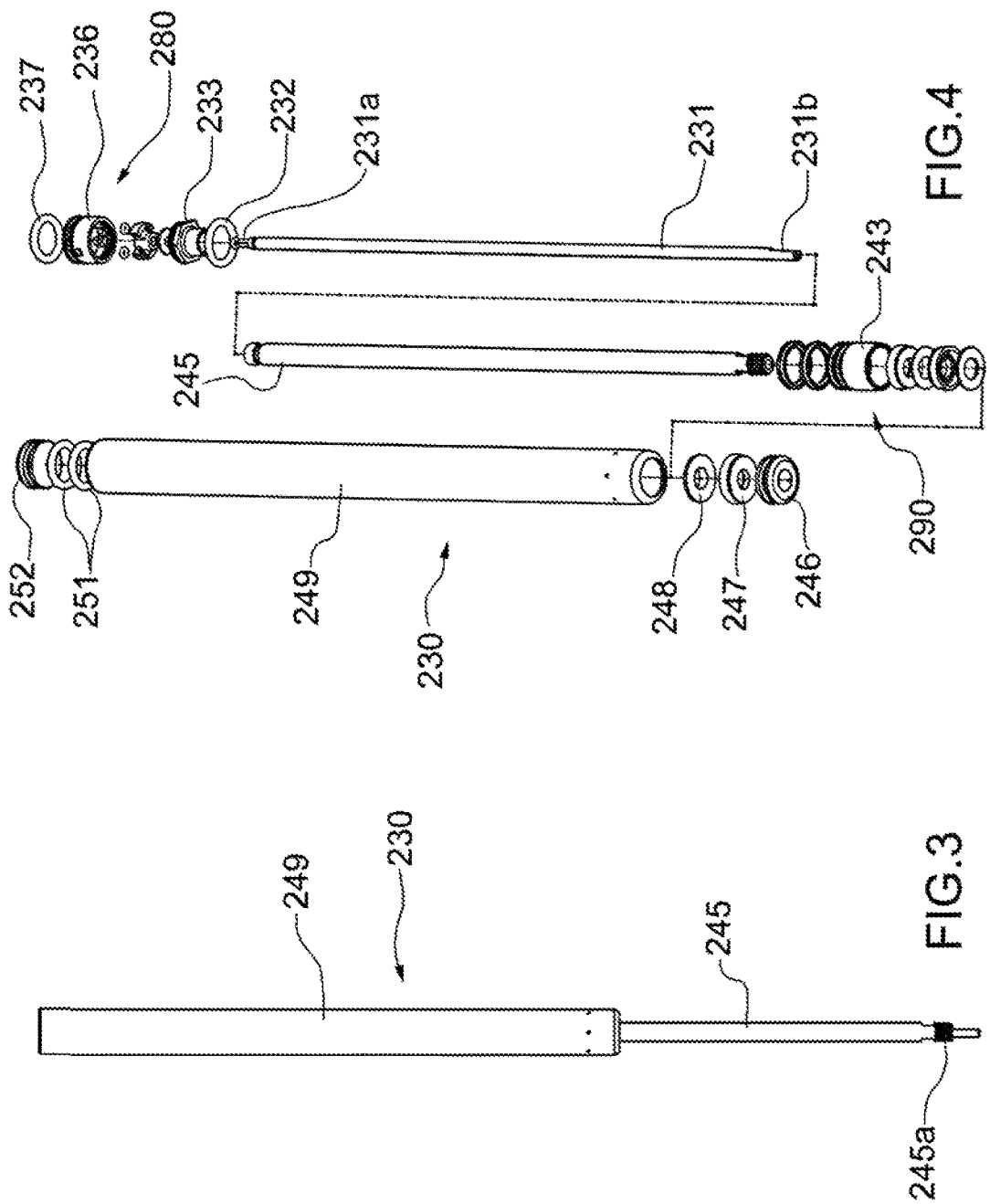

ADJUSTABLE HEIGHT SEAT POST

TECHNICAL FIELD OF THE INVENTION

The present invention relates to an adjustable height seat post.

More specifically, the present invention relates to a remote control adjustable height seat post for bicycles and the like.

STATE OF THE ART

Remote control height adjustable bicycle seat posts are now common on the market, because they allow riders to easily adjust the height of their saddle during a ride, particularly during mountain biking, but also for other bicycling types including road, gravel, and cyclocross.

Typical adjustable height seat posts require a cable and cable housing that starts at the seat post and end at a handlebar mounted lever or button.

There is a recent trend to reduce the amount of exposed cable housing of the adjustable seat post on a bike in order to reduce the clutter, confusion, and chances that the cable and housing become snagged or a nuisance.

Currently, bikes have at least four cables or lines including one for a rear brake, a front brake, a rear shifter, and a front shifter.

Sometimes other cables are also included such as cables to remotely adjust front or rear shock absorber performance.

Hidden—or partially hidden—adjustable seat post cables are called "Stealth routing", which hides as much of the cable as possible.

Adjustable height seat posts with "Stealth routing" have a cable and housing that exits the bottom of the seat post and is routed internally through of the bicycle frame and then exit out through a hole in the frame and continue over to the remote control unit mounted on the handlebar.

One problem with this method is that many existing height adjustable seat posts have a cable housing that moves during the activation—to push the valve rod as described below—and the seat post does not function properly if the cable housing movement is restricted, such as when exiting the bicycle frame.

Also, installing the seat post into the frame is difficult, and it requires tools to remove or install the actuation assembly to the bottom of the seat post.

Many adjustable seat posts use a fluid, particularly oil, to lock the height position, and most commonly the activation is a push rod.

Specifically, pushing a rod linearly causes an internal valve to open, which allows oil to pass from one chamber to another.

However, this push action requires a large force, and this force becomes even larger if the rider's weight is on the saddle during activation, because the rider's weight increases internal oil pressure which forces the valve to be closed tighter.

The obvious ultimate solution to having a cable and housing would be an electrically activated adjustable seat post, but current linear valve designs require so much force to activate them that the electrical driver—motor or solenoid, for example—must be large and heavy, and the power source must be powerful, and it would be heavy and bulky. Some hydraulically height adjustable seat posts have a valve system that is integrated into the main body and quill.

One problem with this is that, if contamination leaks past the quill and into the valve system, then the system will become damaged and it will not work properly.

Furthermore, rebuilding these systems is difficult, and it usually requires sending the seat post into an authorized repair center, which is expensive and it takes too much time. Other hydraulic height adjustable seat posts have a replaceable cartridge which provides a second barrier to contamination, but these cartridge assemblies are still somewhat difficult to access and replace for the average rider, and these cartridges have the same linear actuating rod that is hard to push.

Existing "Stealth routed" height adjustable seat posts are difficult to install partly because tools are required to connect the cable to the bottom of the seat post body.

These same seat posts oftentimes require readjusting the cable after reinstalling the seat post into the bicycle frame.

Some height adjustable seat posts can be internally damaged if the cable adjustment is wrong or if the rider presses the activation lever too hard.

U.S. Pat. No. 8,308,124 discloses a typical hydraulic adjustable seat post wherein a push rod moves linearly to open the valve, and it allows height adjustment.

When the rider sits on bicycle saddle, pressure increases inside the seat post causing the force to increase to move the push rod to open the valve.

In an electrically actuated embodiment, disclosed in the same document, the electromagnetic driver can push the rod to open the valve, but in reality, the force required to achieve this—especially with a rider sitting on the saddle—would require the electro-magnetic diver to be extremely large, and it also would require far more energy consumption than would be reasonable in this application.

It would, in fact, be difficult or impossible to fit a powerful enough driver inside of the bicycle frame's seat tube and even if it were possible, a reasonable sized battery might only perform 10 or 20 activations between being drained.

SUMMARY OF THE INVENTION

The technical aim of the present invention is therefore to improve the state of the art. Within such technical aim, it is an object of the invention to develop an adjustable height seat post in which the valve of the hydraulic height adjustment means can be operated by the user regardless of any pressure exerted on the saddle, for example the user sitting on it.

Another object of the present invention is to devise an adjustable height seat post in which the valve of the hydraulic height adjustment means can be operated by light and space saving actuation means.

A further object of the invention is to develop an adjustable height seat post in which the hydraulic height adjustment means can be easily and quickly replaced by the user, even without tools.

Still another object of the invention is to devise an adjustable height seat post possibly free of any actuation cable and cable housing.

This aim and these objects are all achieved by the adjustable height seat post according to the present application.

The adjustable height seat post comprises supporting means connectable to the bicycle frame, a quill, associated with the supporting means and having a head suitable to clamp the rails of the saddle of a bicycle, or the like, in the desired position.

The seat post further comprises hydraulic adjusting means, associated with the supporting means, for lifting or lowering the quill in the desired position selected by the user; the hydraulic adjusting means comprise a cylindrical chamber inside which a piston assembly is foreseen, and valve means, suitable to selectively open or close an hydraulic path through the piston assembly, for selectively lock or unlock the position of the piston assembly relative to the cylindrical chamber.

According to the invention, the valve means comprise at least a valve body, associated with the piston assembly, which is selectively rotatable from an open position, in which the hydraulic path through the piston assembly is open, to a closed position in which the hydraulic path through the piston assembly is closed.

According to a specific embodiment of the invention, the above described valve means can be operated by a remote control, installed on the bicycle handlebar, by means of a wireless communication or by means of an electric wired communication.

The present specification refers to preferred and advantageous embodiments of the invention.

BRIEF DESCRIPTION OF THE DRAWINGS

These and other advantages will be better understood by any man skilled in the art from the following description that follows and from the attached drawings, given as a non-limiting example, in which:

FIG. 3 is a side view of the valve cartridge assembly of the seat post;

FIG. 4 is an exploded view of the valve cartridge assembly shown in FIG. 3;

DETAILED DESCRIPTION OF THE INVENTION

Figure 1:
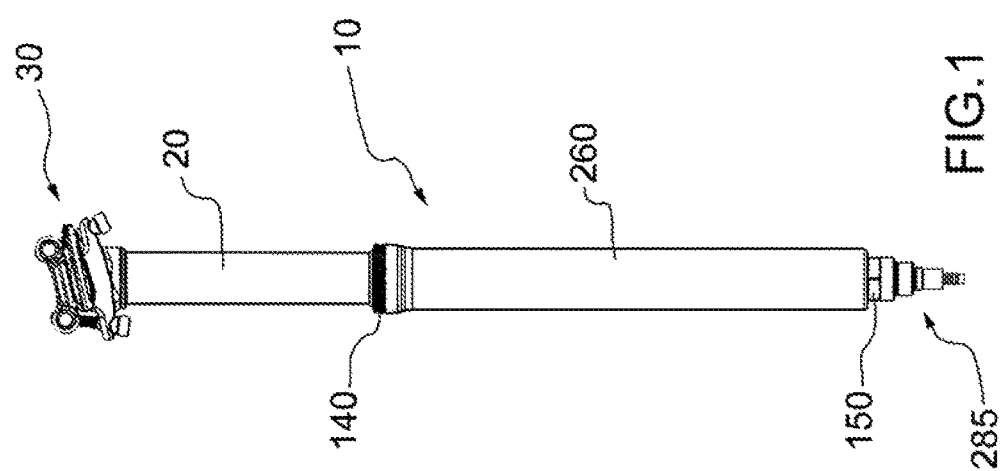
FIG. 1 is a side view of an adjustable height seat post according to the invention.
Figure 5:
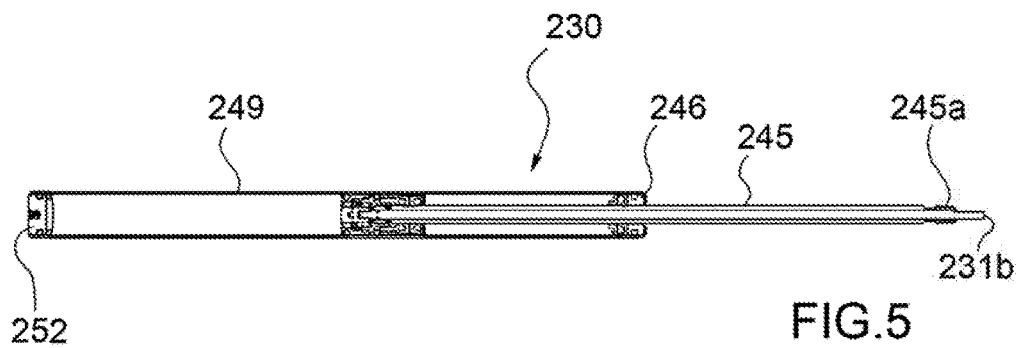
FIG. 5 is a section view of the valve cartridge assembly of the seat post.

With reference to FIG. 1, an adjustable height seat post according to the invention is wholly indicated with 10.

In the embodiment disclosed hereafter individual characteristics, given in connection with such specific embodiment, may actually be interchanged with other different characteristics that exist in other embodiments.

The adjustable height seat post 10 according to the invention is of the kind suitable to clamp the rails of the saddle of a bicycle, or the like, in the desired position.

The saddle comprising such rails can be of any kind, without any limitation.

The adjustable height seat post 10 comprises a quill 20.

The quill 20 comprises a quill head 30, which is suitable to clamp the rails of a saddle. The head 30 is associated to a lower cradle 40 and to an upper cradle 50 which are, in use, reciprocally coupled in order to clamp the rails of the saddle.

The lower cradle 40 and the upper cradle 50 are reciprocally coupled by means of passing front and rear screws 90, engaged in respective front and rear barrel nuts 60 and curved washers 80.

The seat post 10 further comprises supporting means 260 for the quill 20, said supporting means 260 being connectable to the bicycle frame, as better disclosed hereafter.

Figure 22:
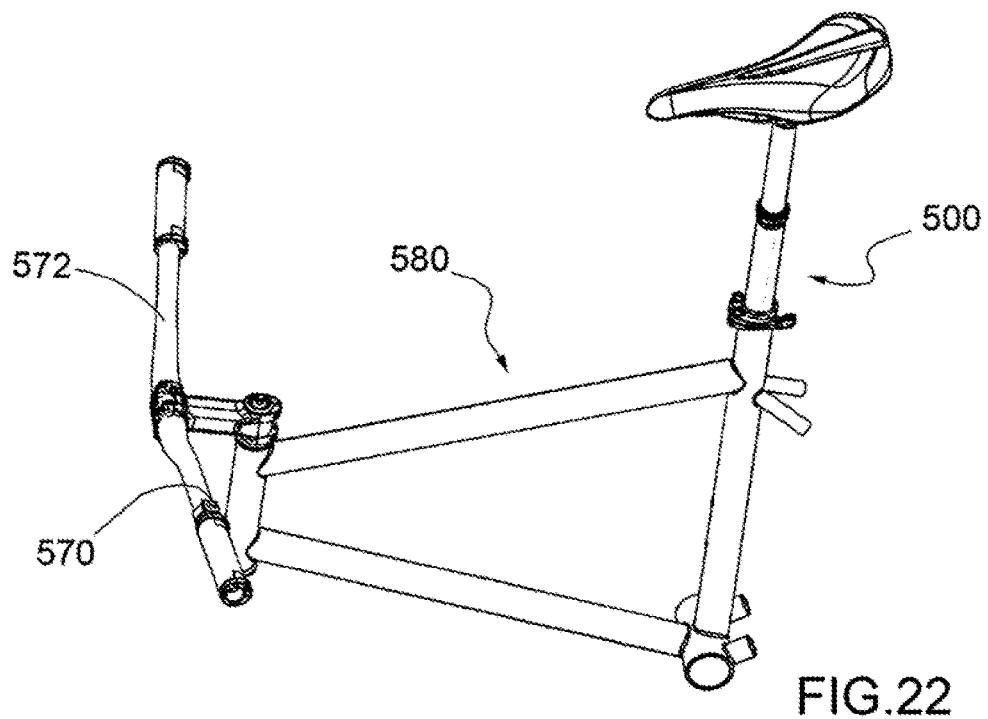
FIG. 22 is a perspective view of a bicycle assembly comprising the seat post according to the embodiment of FIG. 18.
Figure 25:
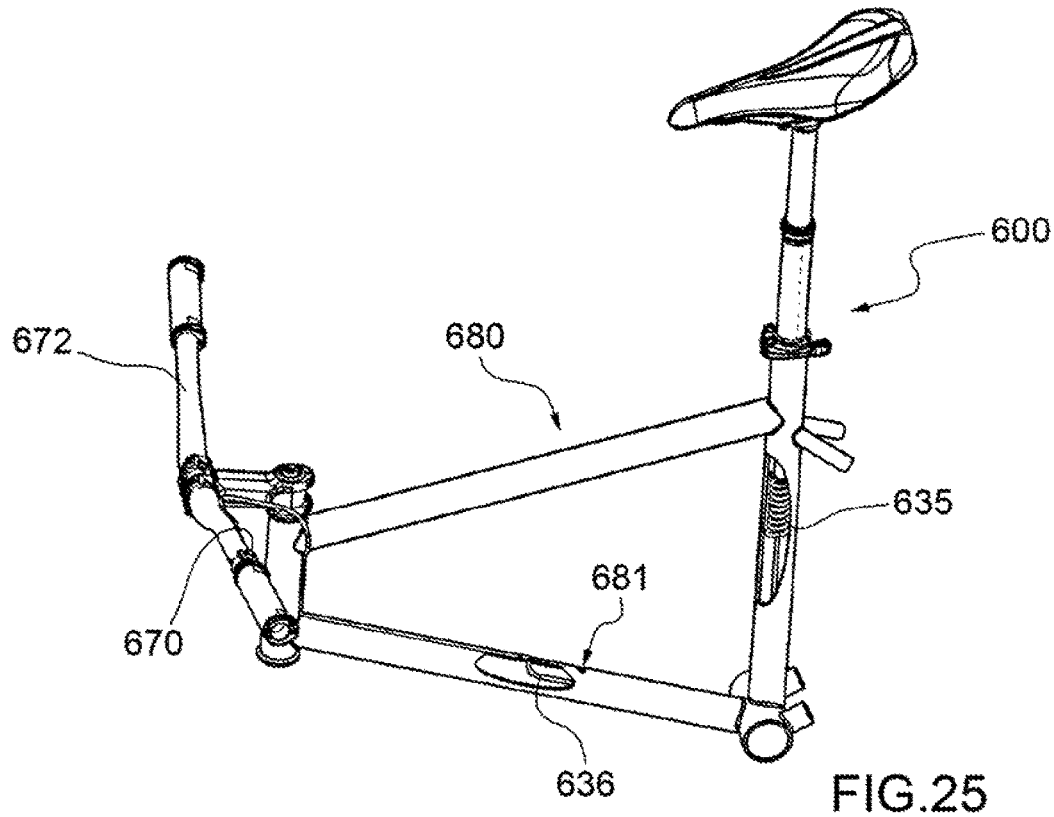
FIG. 25 is a perspective view of a bicycle assembly comprising the seat post according to the embodiment of FIG. 23.

More in detail, the supporting means 260 comprise a tubular body 260 which is suitable to be inserted inside the saddle tube of the bicycle frame, as shown for example in FIGS. 22,25.

The quill 20 is partially inserted inside the tubular body 260, and it is free to slide along the axis of the latter.

The upper end of the tubular body 260 is closed by an upper bushing 120, a seal 130 and a body ring 140.

The lower end of the tubular body 260 is closed by a body cap 150.

The quill 20 comprises two keys 100 for the rotational alignment to the tubular body 260.

The bottom of the quill 20 is supported by a lower bushing 110, regardless of the relative linear position.

The seat post 10 comprises hydraulic adjusting means 230 for lifting or lowering the quill 20—and consequently the bicycle saddle—in the desired position, selected by the user.

More in detail, the hydraulic adjusting means 230 comprise a hydraulic valve cartridge assembly 230 suitable to selectively lift or lower the quill 20 in the desired position, as better disclosed hereafter.

The valve cartridge assembly 230 comprises a cylindrical chamber 249 inside which a piston assembly 280 is foreseen; a piston shaft 245, connected to the piston assembly 280, comes out from an end of the cylindrical chamber 249.

The valve cartridge assembly 230 is inserted inside the quill 20 with the piston shaft 245 which, in use, is facing downwards.

Figure 8:
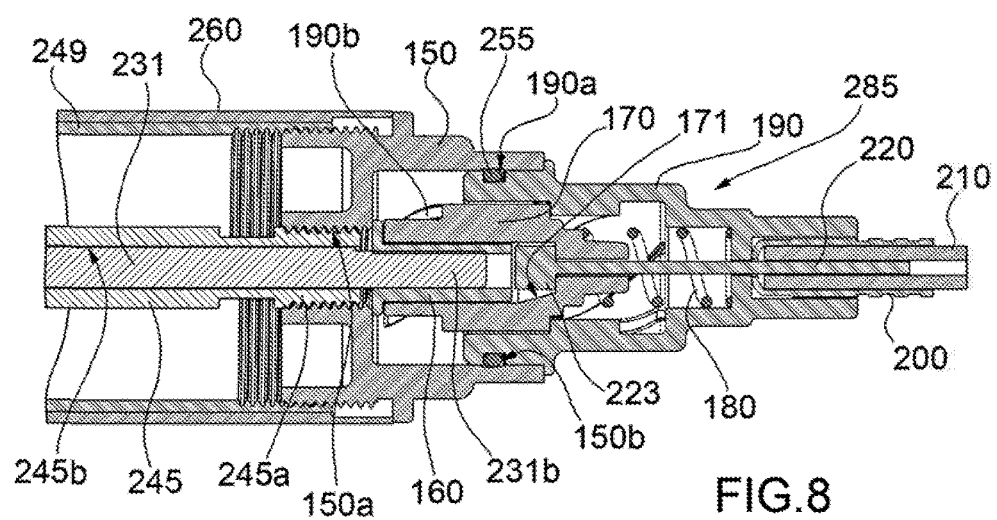
FIG. 8 is a close up section view of the seat post according to the invention, with the valve actuation assembly in the closed position.

The piston shaft 245 has a threaded end 245a which is permanently engaged in a corresponding threaded hole 150a foreseen in the body cap 150 (see FIG. 8).

The valve cartridge assembly 230 comprises valve means 222, suitable to selectively open or close a hydraulic path through the piston assembly 280.

The seat post 10 further comprises valve actuation means 285 suitable to selectively drive the valve means 222 in the open or closed position, as better disclosed hereafter. Valve actuation means 285 may be driven by remote control, according to details provided hereafter.

Valve actuation means 285 are associated to the lower end of the piston shaft 245.

The cylindrical chamber 249, in use, has an upper end which is closed by a top cap 252 and by O-rings 251; the lower end of the cylindrical chamber is closed by a lower washer 248, a lower seal 247 and a lower body cap 246, through which the piston shaft 245 is passing.

The top cap 252 comprises a threaded hole for a central screw 70, suitable to secure, in use, the valve cartridge assembly 230 to the head 30.

The piston assembly 280 (see FIG. 6) comprises a piston body 233, coupled to the inner end of the piston shaft 245.

The piston assembly further comprises a piston cap 236, screwed to the piston body 233.

The piston cap 236 comprises respective piston holes 236a, having respective axes parallel to the piston cap 236 axis.

A first O-ring 237 is associated with the piston cap 236, while a second bumper O-ring 232 is associated with the piston body 233.

The valve cartridge assembly 230 comprises a floating piston 290.

The floating piston 290 defines a central hole through which the piston shaft 245 is passing.

The floating piston 290 delimits, with lower body cap 246, a pressurized gas chamber 249c inside the cylindrical chamber 249.

The floating piston 290 comprises a floating piston body 243, and first seals 244 which contact, in use, the internal surface of the cylindrical chamber 249.

The floating piston 290 further comprises second seals 239,242 which, in use, contact the external surface of the piston shaft 245.

Second seals 239,242 are held in position by washers 238,241.

With such a solution, inside cylindrical chamber 249 a first hydraulic chamber 249a and a second hydraulic chamber 249b are defined.

According to an aspect of the present invention, the valve means 222 comprise a valve body 234, associated with the piston assembly 280, which is selectively rotatable from an open position in which the hydraulic path through the piston assembly 280 is open, to a closed position in which the hydraulic path through the piston assembly 280 is closed.

Thanks to this solution, and as it will be better disclosed hereafter, the actuation force required to rotate the valve body 234 is totally independent from a possible increase pressure in first hydraulic chamber 249a, as it happens, for example, when a rider sits on the saddle.

More in detail, the valve body 234 is substantially disc-shaped, and it is provided with valve holes 234a.

Valve holes 234a have respective axes parallel to the valve body 234 axis.

Piston cap o-rings 235 are foreseen between the piston cap 236 and the valve body 234, particularly by the openings of the piston holes 236a.

Valve body 234 is operatively connected to the valve actuation means 285.

More in detail, and referring for example to FIG. 4, the valve actuation means 285 comprise an actuation rod 231 having a first end 231a rigidly connected—for example keyed—to the valve body 234, and a second end 231b associated with an actuation cable 220 according to the solution disclosed hereafter.

A washer 253 is interposed between valve body 234 and piston body 233.

The valve actuation means 285 are suitable to convert the pulling action of the actuation cable 220 in a rotation of the actuation rod 231, and therefore in a rotation of the disc body 234.

The actuation rod 231 is inserted in a passing axial cavity 245b foreseen in the piston shaft 245.

Figure 9:
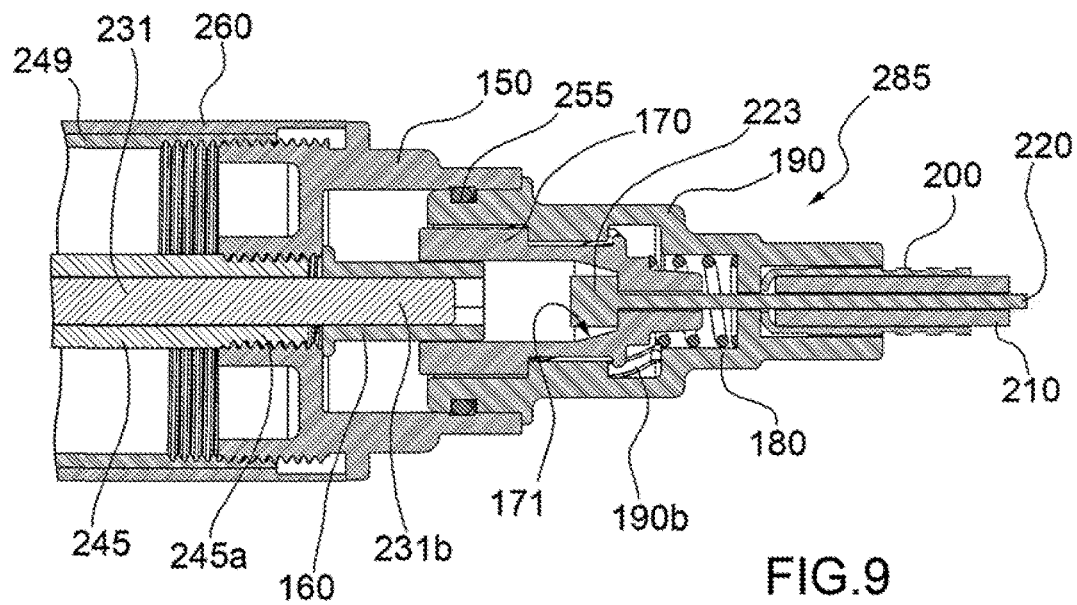
FIG. 9 is a close up section view of the seat post according to the invention, with the valve actuation assembly in the open position.
Figure 10:
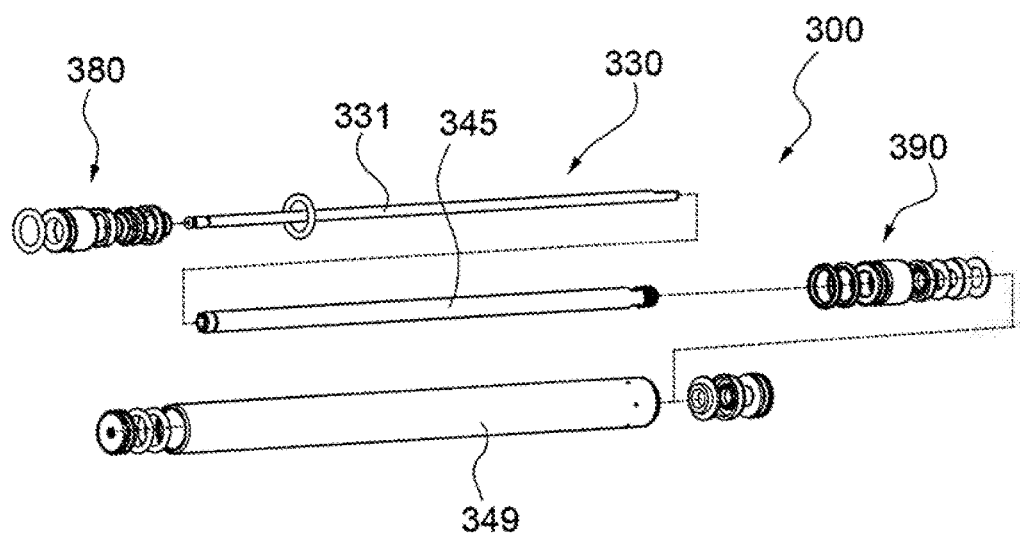
FIG. 10 is an exploded view of the valve cartridge assembly according to another embodiment of the seat post according to the invention.
Figure 11:
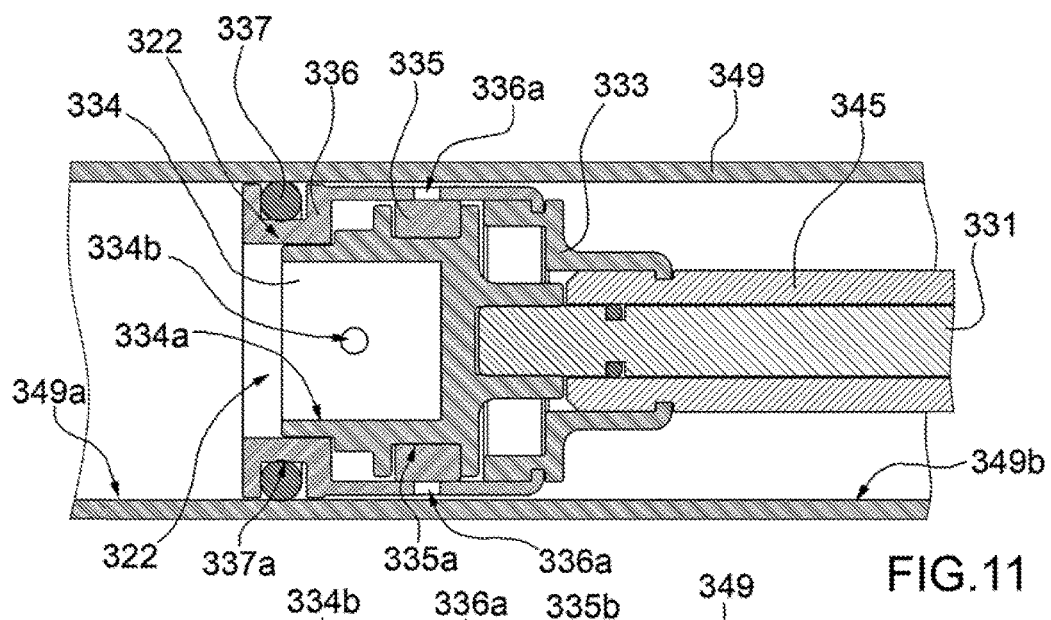
FIG. 11 is a close up section view of the valve cartridge assembly of FIG. 10, in the closed position.
Figure 12:
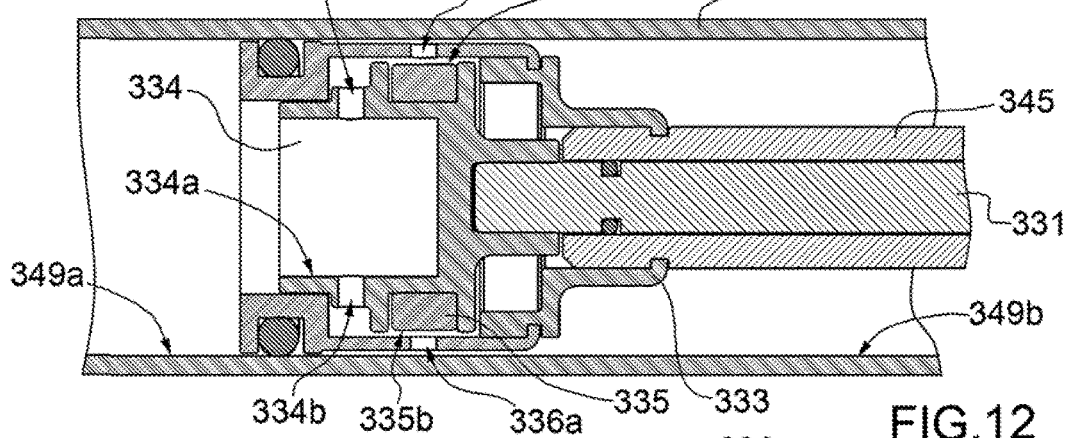
FIG. 12 is a close up section view of the valve cartridge assembly of FIG. 10, in the open position.

Referring now to FIGS. 8 and 9, the second end 231b of the actuation rod 231 is keyed to an adapter 160, which is in turn keyed to a twist cap 170.

The twist cap 170 is housed inside a cable cap 190.

The cable cap 190 comprises an external groove 190a, and the body cap 150 comprises a corresponding internal groove 150b; in such facing grooves 190a, 150b an o-ring 255 is fitted, in order to prevent movements of the cable cap 190 out of the body cap 150. A spring 180 is interposed between the lower end of the twist cap 170 and the internal surface of the cable cap 190.

The twist cap 170 comprises an inner seat 171 in which the thickened end 223 of the actuation cable 220 is engaged.

Figure 2:
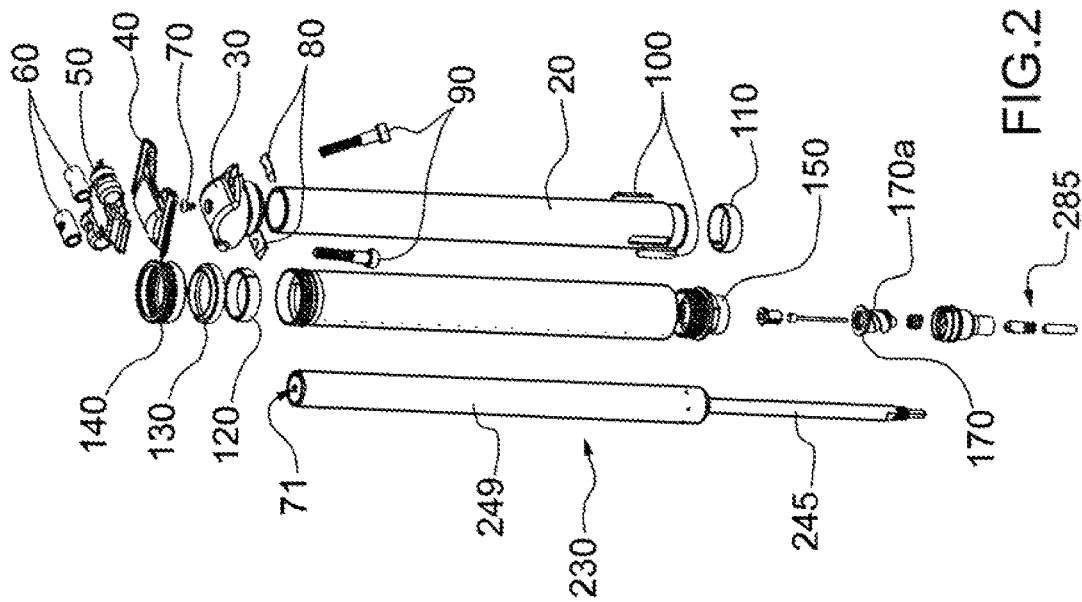
FIG. 2 is an exploded view of the seat post of FIG. 1.

The twist cap 170 comprises an outer helix 170a—see FIG. 2—which engages a corresponding inner helix 190b of the cable cap 190; therefore, twist cap 170 rotates when actuation cable 220 is pulled, as better disclosed hereafter.

The actuation cable 220 is inserted within a cable housing 210, whose end is engaged by a ferrule 200, which helps adjusting any slack in the actuation cable 220.

The operation of the height adjustable seat post 10 according to the invention is as follows.

Figure 7:
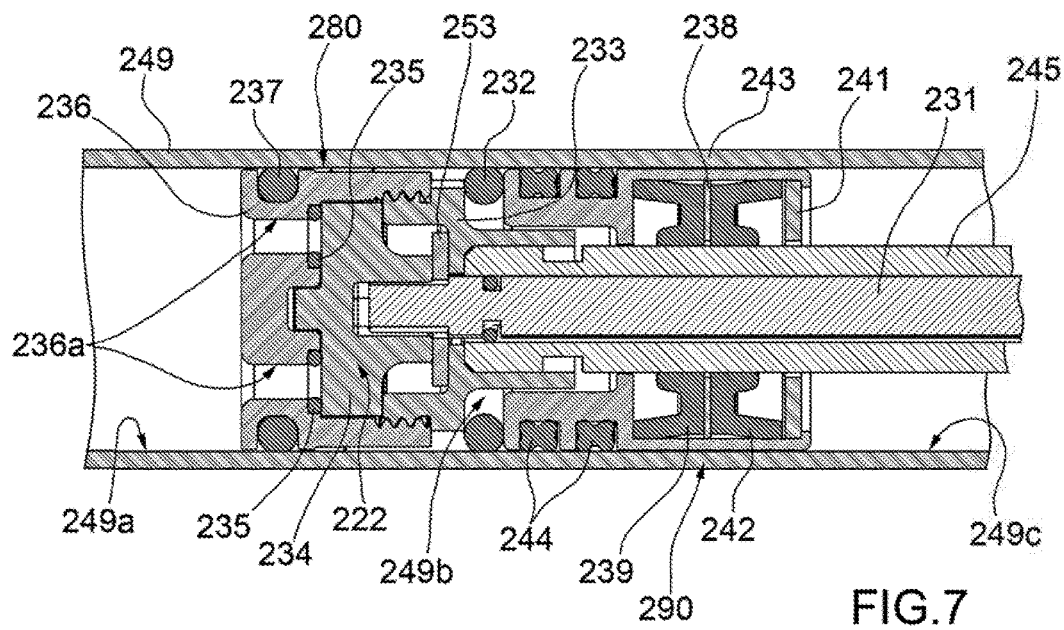
FIG. 7 is a close up section view from FIG. 5 with the valve in a closed position.

FIG. 7 shows, in detail, the piston assembly 280 and the floating piston 290 with valve means 222 in closed position.

In this position, piston holes 236a are not aligned with valve holes 234a; this means that the hydraulic path 236a, 234a between the first hydraulic chamber 249a and the second hydraulic chamber 249b is fully closed.

Therefore, oil contained in the first hydraulic chamber 249a cannot travel through the piston assembly 280: thus the piston assembly 280 cannot move, in use, upwards, which means that the cylindrical chamber 249 (and therefore the quill 20) cannot move, in use, downwards, regardless of the load applied.

In other words, the valve cartridge assembly 230 is fully rigid in compression.

A certain movement may be allowed in traction, thanks to the compression of the pressurized gas chamber 249.

FIG. 8 shows in detail the valve actuation means 285 when the valve means 222 are in the above described closed position.

In this situation, the spring 180 forces the twist cap 170 in the angular position corresponding to the closed position of the valve body 234 shown in FIG. 7.

Therefore, the valve means 222 are normally closed.

When the rider wishes to modify the height of the seat post 10, in other words to modify the position of the quill 20 with respect to the tubular body 260, he pulls the actuation cable 220—for example acting on a suitable remote control—thereby providing a rotation of the twist cap 170.

The twist cap 170 is therefore dragged in the position shown in FIG. 9, and the spring 180 is consequently compressed.

Figure 6:
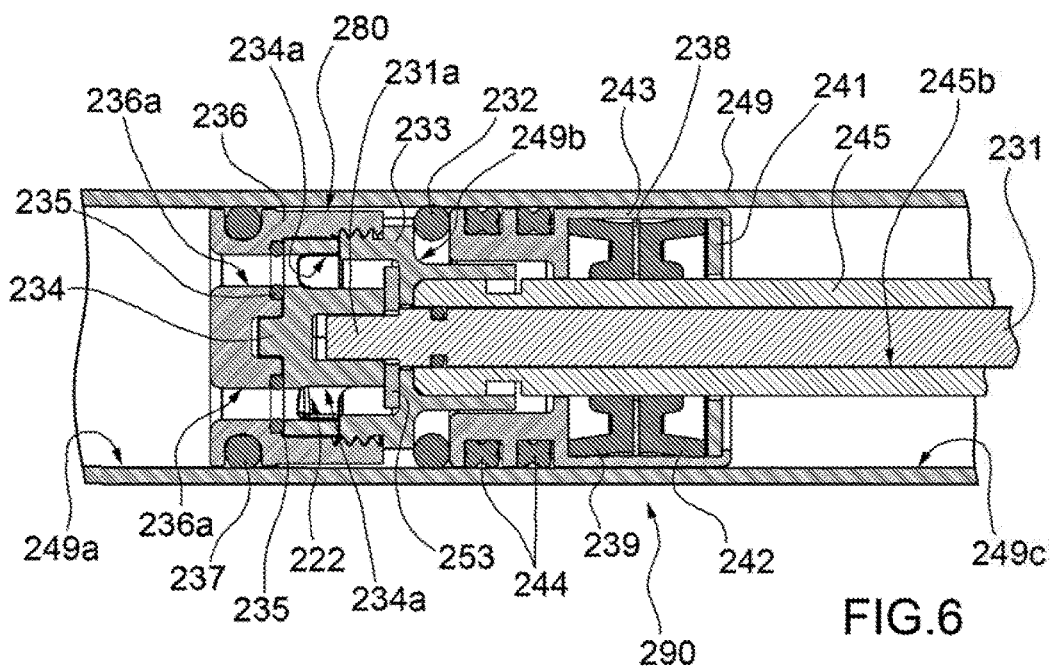
FIG. 6 is a close up section view from FIG. 5 with the valve in an open position.

The actuation rod 231 is thus rotated together with the valve body 234, until the open position of the valve means 222 shown in FIG. 6 is achieved.

In this open position, oil is free to travel from the first hydraulic chamber 249a to the second hydraulic chamber 249b, and the piston assembly 280 is free to move, in use, upwards along the cylindrical chamber 249.

Since piston shaft 245 occupies volume, a resulting hydraulic force pushes the floating piston 290, in use, downwards, increasing pressure in the pressurized gas chamber 249c: therefore the piston shaft 245 is forced to extend outside the cylindrical chamber 249, unless enough force is applied to the upper end of the valve cartridge assembly 230, such as the rider sitting on the saddle.

When the desired position of the quill 20 is achieved, the actuation cable 220 is released by the user, and the spring 180 pushes the twist cap 170 back to the position shown in FIG. 8.

As a consequence, the actuation rod 231 rotates inside the piston shaft 245 of a certain angle, dragging with itself the valve body 234.

The valve body 234 is therefore rotated again in the closed position, wherein the hydraulic path 236a,234a is fully closed and the cylindrical chamber 249—on which the load is applied—cannot move with respect to the piston shaft 245.

Therefore the valve cartridge assembly 230 can be hydraulically locked in any linear position along its possible travel whenever the valve body 234 is rotated in the closed position, because this blocks oil passage between first hydraulic chamber 249a and second hydraulic chamber 249b.

The valve body 234 can be easily rotated—for example about 45°—between fully open and fully closed positions.

As oil pressure increases in first hydraulic chamber 249a, as it happens when a rider sits on the saddle, the force—torque—required to rotate valve body 234 remains unchanged except for a negligible increase in friction between valve body 234 and washer 253.

It should be noted that the cable cap 190 fits tight enough into body cap 150 that the actuation cable 220 rotates the valve body 234 through its full travel, and cable cap 190 only rotates relative to body cap 150 in case the actuation cable 220 is pulled beyond the valve body 234 reaching its full travel (a fully open position).

This is how self-adjustment takes place, and valve damaged is prevented.

In other words, after initial assembly and regardless of exactly where valve body 234 is rotated, the actuation cable 220 will first fully open the valve means 222, and then rotate the cable cap 190 relative to body cap 150 until full cable travel is reached; then, after releasing actuation cable 220, the spring 180 will return the valve body 234 to a fully closed position.

Any slack in the actuation cable 220 can now be adjusted out for example by using the ferrule 200.

As stated before, the o-ring 255 prevents cable cap 190 from linearly moving out from body cap 150 when rotating, and also prevents spring 180 from possibly pushing cable cap 190 out of body cap 150.

Therefore, self-adjustment occurs because, no matter what position the valve body 234 is during installation, after one pull of the actuation cable 220, valve means 222 will be set in the correct position.

Also, to prevent possible valve damage, no matter how hard the actuation cable 220 is pulled, the valve body 234 is exposed only to a small force, because either the cable cap 190 will turn to protect the valve body 234, or the twist cap 170 will bottom out against the cable cap 190, preventing any further twisting action.

During installation of the seat post 10, or during removal of the latter from the bicycle frame, the valve actuation means 285 can be pushed into body cap 150 without tools and also removed from body cap 150 again without any tools, by simply pushing or pulling firmly with fingers on cable cap 190.

Replacing the valve cartridge assembly 230 only requires unscrewing central screw 70 from head 30, pulling cable cap 190 out of body cap 150, unscrewing body cap 150 from tubular body 260, and unscrewing piston shaft 245 from body 150, and then reversing the process for installation of the new cartridge assembly.

Relative to existing height adjustable seat posts, this solution is very simple.

Another embodiment of the seat post 300 according to the present invention is shown in FIGS. 10-14.

This embodiment 300 of the invention differs from the previous one (FIGS. 1-9) with reference to the valve cartridge assembly 330, and more in particular—and entirely—with reference to the piston assembly 380.

In this embodiment, the piston assembly 380 comprises a piston body 333 connected to the piston shaft 345, and a piston cap 336 coupled to the piston body 339 and provided with lateral holes 336a.

In particular, the piston cap 336 comprises two diametrically opposite first lateral holes 336a, and an o-ring seal 337 fitted in a first external groove 337a.

The valve means 322 comprise a valve body 334, keyed to the actuation rod 331 and housed inside a cavity of the piston cap 336.

The valve body 334, which is substantially disc-shaped, comprises a front cavity 334a, and second lateral holes 334b, communicating with said front cavity 334a.

In particular, the valve body 334 comprises two diametrically opposite second lateral holes 334b.

The lateral surface of the valve body 334 comprises a second external groove 335a for a valve seal 335 which, in use, is arranged in an axial position corresponding to that of the first lateral holes 336a of the piston cap 336.

Figures 13, 14:
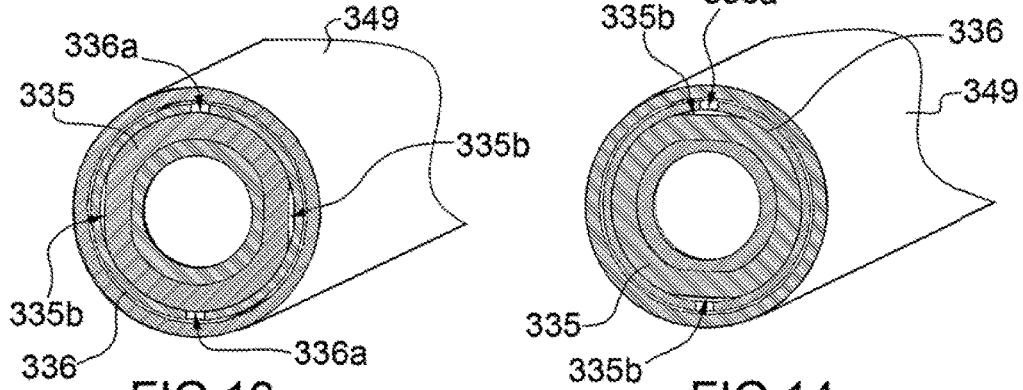
FIG. 13 is a sectional perspective view of the valve cartridge assembly of FIG. 10, in the closed position.
FIG. 14 is a sectional perspective view of the valve cartridge assembly of FIG. 10, in the open position.

The valve seal 335 is substantially ring-shaped, comprises two diametrically opposite flat areas 335b, which can be better seen in FIGS. 13,14.

The second lateral holes 334b of the valve body 334 are arranged in the same angular position of the flat areas 335b, with respect to the axis of the valve cartridge assembly 330.

In use, when the valve body 334 is rotated in the closed position (FIGS. 11, 13), valve seal 335 blocks oil from flowing through first lateral holes 336a, which means that oil cannot flow between the first hydraulic chamber 349a and the second hydraulic chamber 349b: therefore the piston assembly 380 is locked relative to the cylindrical chamber 349.

When the valve body 334 is rotated in the open position (FIGS. 12,14) valve seal 335, thanks to its flat areas 335b, allows oil to flow through second lateral holes 334b and first lateral holes 336a, therefore allowing oil flow between the first hydraulic chamber 349a and the second hydraulic chamber 349b: the piston assembly 380 is free to move linearly relative to the cylindrical chamber 349.

FIG. 13 shows flat areas 335b about 90° rotated from a fully open position, but actually flat areas 335b only need to be rotated about 45° between fully open and fully closed position.

Piston assembly 380 is another way to achieve a low friction rotating valve that is unaffected in actuation force even when a rider is sitting on the saddle.

Figure 15:
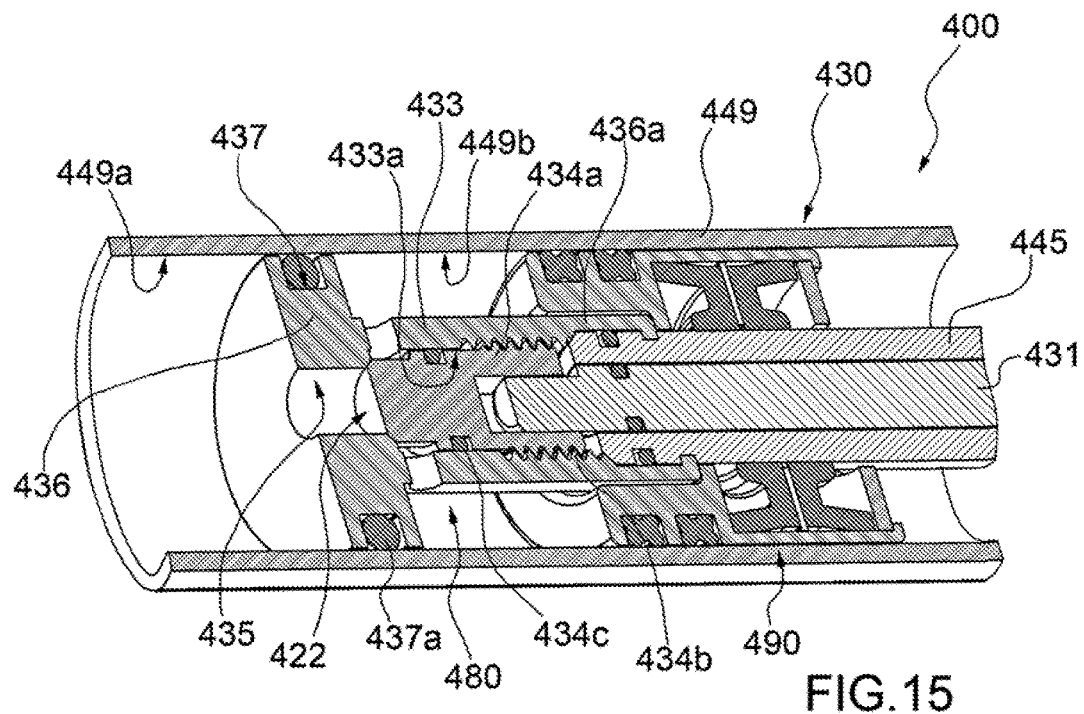
FIG. 15 is a sectional close up perspective view of the valve cartridge assembly according to another embodiment of the seat post according to the invention, in the closed position.
Figure 16:
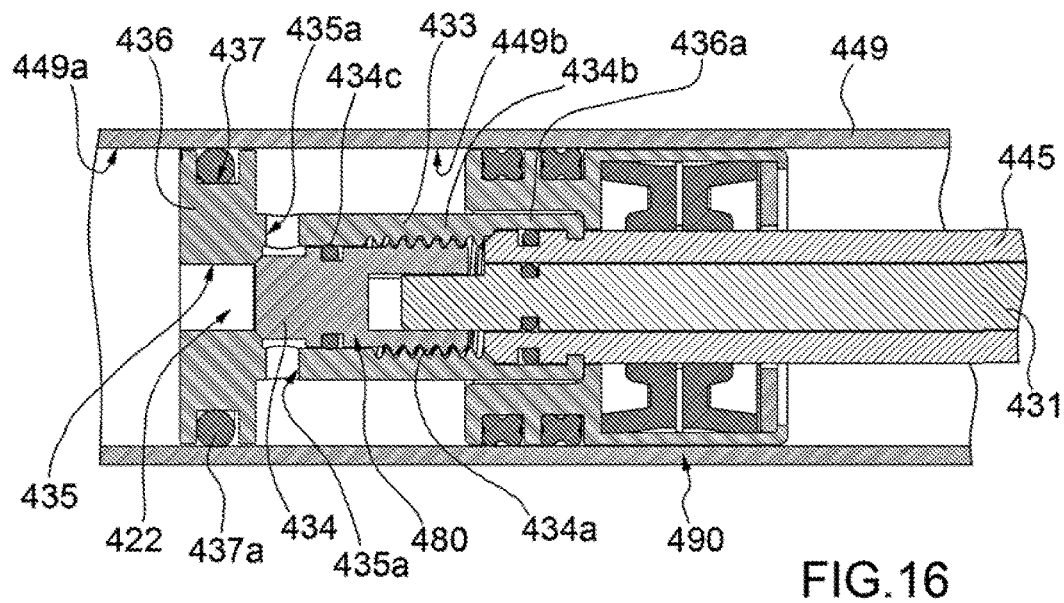
FIG. 16 is a close up section view of the valve cartridge assembly of FIG. 15, in the closed position.
Figure 17:
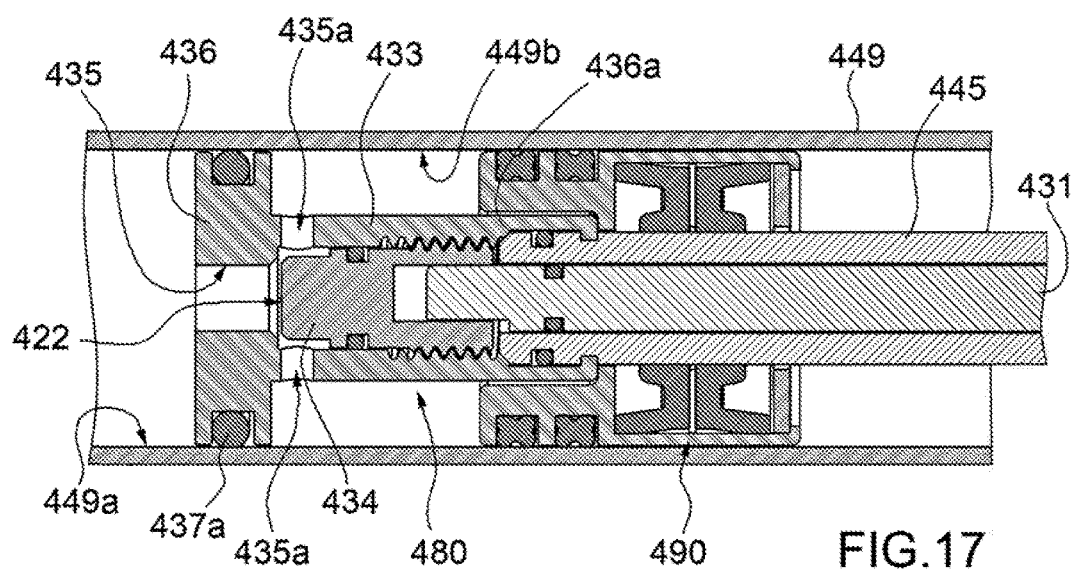
FIG. 17 is a close up section view of the valve cartridge assembly of FIG. 15, in the open position.
Figure 18:
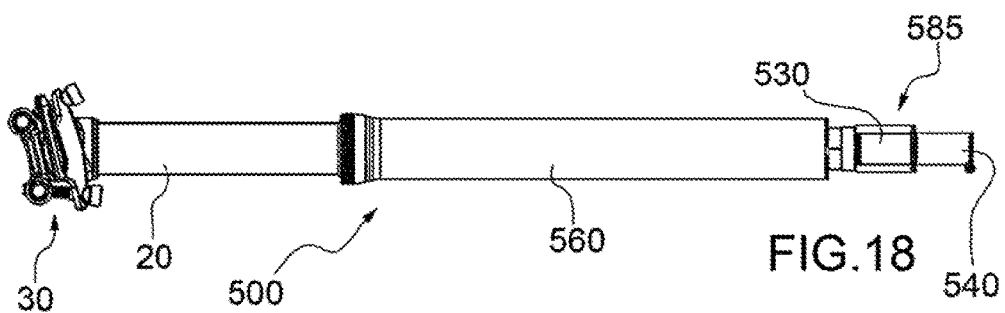
FIG. 18 is a side view of an adjustable height seat post according to a further embodiment of the present invention.
Figure 19:
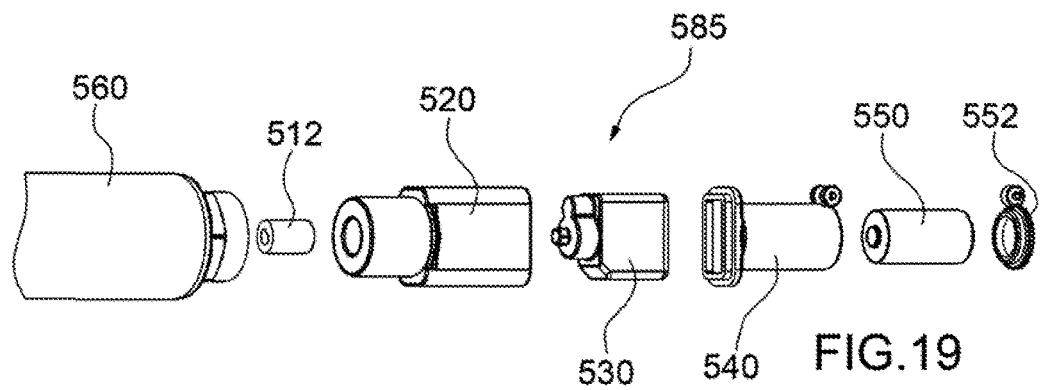
FIG. 19 is an exploded close up view of the seat post according to the embodiment of FIG. 18.
Figure 20:
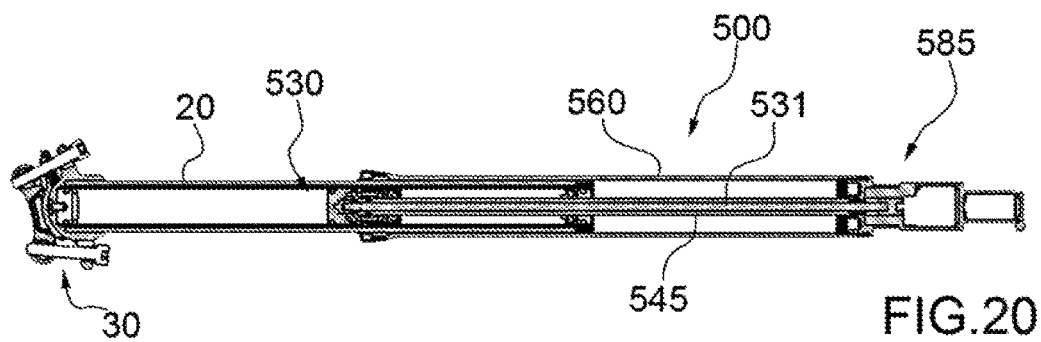
FIG. 20 is a section view of the seat post according to the embodiment of FIG. 18.
Figure 21:
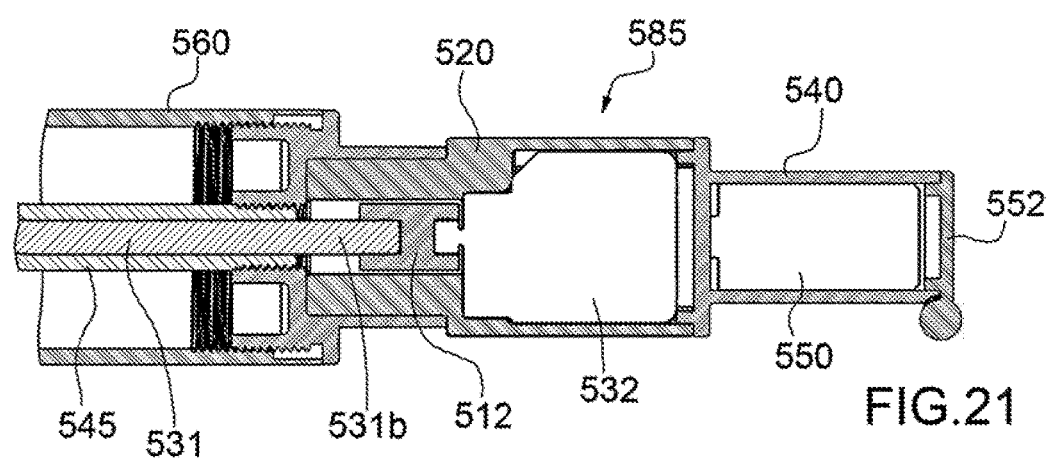
FIG. 21 is a close up section view from FIG. 20.

Another embodiment of the seat post 400 according to the present invention is shown in FIGS. 15-17.

This embodiment 400 of the invention differs from the previous ones (FIGS. 1-9 and FIGS. 10-14) with reference to the valve cartridge assembly 430, and more in particular—and entirely—with reference to the piston assembly 480, which in FIG. 15-17 is shown associated with floating piston 490.

In this embodiment, the piston assembly 480 comprises a piston body 433 connected to the piston shaft 445.

The piston body 433 comprises a head 436 and a stem 436a, having lower diameter.

The piston body 433 comprises a passing axial channel 433a, a portion of which is constituted by a nut 434b.

Stem 436a and internal surface of cylindrical chamber 449 define the second hydraulic chamber 449b of the valve cartridge assembly 430.

Valve means 422 comprise a valve body 434.

The valve body 434 comprises a threaded plug, engaged inside said passing axial channel 433a and having a threaded portion 434a screwed in nut 434b.

An o-ring seal 434c is fitted in an external groove of the valve body 434.

Valve body 434 is keyed to actuation rod 431.

The head 436 comprises an external groove 437 in which an o-ring seal 437a is fitted.

The head 436 further comprises a front opening 435.

The front opening 435 of head 436 constitutes the end portion of the passing axial channel 433a, and it communicates with lateral openings 435a of the stem 436a.

Lateral openings 435a can be selectively put in fluid communication with the second hydraulic chamber 449b, as better explained hereafter.

FIG. 16 shows piston assembly 480 in the closed position.

In this position, valve body 434 fully closes front opening 435 of head 436, and oil is prevented from flowing between first hydraulic chamber 449a and second hydraulic chamber 449b.

Piston assembly 480 is therefore linearly blocked relative to cylindrical chamber 449.

FIG. 17 shows piston assembly in the open position.

In this position, valve body 434 is rotated away from front opening 435 enough to allow oil to flow through lateral openings 435a: in other words, oil is free to flow between first hydraulic chamber 449a and second hydraulic chamber 449b, and piston assembly 480 is consequently free to move linearly relative to cylindrical chamber 449.

Piston assembly 480 is another way to achieve a low friction rotating valve that is unaffected in actuation force even when a rider is sitting on the saddle.

Another embodiment of the seat post 500 according to the present invention is shown in FIGS. 18-22.

This embodiment 500 differs from the previous ones with reference to the valve actuation means 585.

In particular, the valve cartridge assembly 530 of this embodiment of the seat post 500 according to the invention can be any according to one of the embodiments of FIG. 1-9, 10-14 or 15-17 previously described.

More in detail, this embodiment 500 of the invention comprises electric wireless valve actuation means 585, directly connected to the actuation rod 531.

The electric wireless valve actuation means 585 comprise a servo adapter 520, connected to the tubular body 560.

The electric wireless valve actuation means 585 further comprise and a servo and circuit board assembly 532, housed in said servo adapter 520.

A housing 540 is coupled to the servo adapter 520: a battery 550 is contained in the housing 540, which is closed by a rear cap 552.

The servo and circuit board assembly 532 is electrically connected to battery 550.

A connector 512 rigidly joins the servo and circuit board assembly 532 and the second end 531b of the actuation rod 531.

Very small and light servo and circuit board assembly 532 and battery 550 can be used in this solution, because rotating the actuation rod 531 within valve cartridge assembly 530 requires only about 0.2 to 0.4 kg×cm of torque.

For example, a small 6 volt servo and circuit board assembly 532 capable of 1.7 kg×cm torque weighs only 8 grams, and it could actuate the valve cartridge assembly 530 more than two thousand times using a size 28 L lithium 6V battery which has 160 m Ah capacity, weighs only 9 grams, and is 25 mm long×13 mm in diameter.

The maximum torque of the servo and circuit board assembly 532 is high enough to easily rotate the actuation rod 531, but it's less than the torque that could damage the valve cartridge assembly 530.

Most riders raise and lower their saddle about ten times on an average ride, which means that the small battery 550 will last most riders more than a year of typical riding. FIG. 22 shows the adjustable height seat post 500, according to the present embodiment of the invention, installed on a bicycle frame 580.

A remote control 570 is mounted on the handlebar 572, and it includes a transmitter and a battery.

Pushing the remote control 570 button wirelessly sends a command to the servo and circuit board assembly 532 to rotate open the valve cartridge assembly 530: it remains open as long as the button continues to be pushed.

Releasing the remote control button send a command to the servo and circuit board assembly 532 to rotate the valve cartridge assembly 530 closed.

Figure 23:
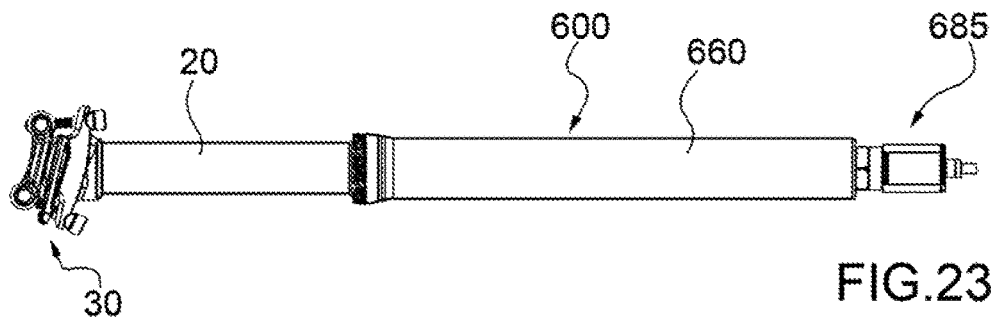
FIG. 23 is a side view of an adjustable height seat post according to still another embodiment of the present invention.
Figure 24:
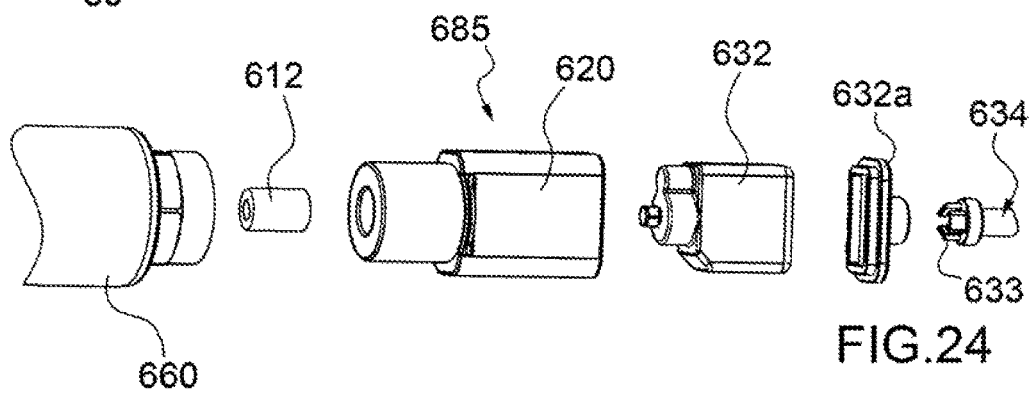
FIG. 24 is a close up exploded view of the seat post according to the embodiment of FIG. 23.

Another embodiment of the seat post 600 according to the present invention is shown in FIGS. 23-25.

This embodiment 600 differs from the previous one (FIGS. 18-22) with reference to the valve actuation means 685.

In particular, the valve cartridge assembly 630 of this embodiment of the seat post 600 according to the invention can be any according to one of the embodiments of FIG. 1-9, 10-14 or 15-17 previously described.

More in detail, this embodiment 600 of the invention comprises electric wired valve actuation means 685, directly connected to the actuation rod (not shown).

With respect to the embodiment 500 of FIGS. 18-22, this embodiment 600 do not comprise a battery and a respective housing; in this embodiment, the servo adapter 620 housing the servo and circuit board assembly 632 is closed by a rear cap 632a, which comprises a seat for a wire assembly 634.

A connector 612 rigidly joins the servo and circuit board assembly 632 and the extremity of the actuation rod (not shown).

FIG. 25 shows the adjustable height seat post 600, according to the present embodiment of the invention, installed on a bicycle frame 680.

Wire assembly 634 comprises a connector 633, a coil 635 and a long flexible wire bundle 636.

The coil 635 allows the seat post 600 to be easily installed and removed: furthermore, it allows the connector 633 to remain connected to the servo and circuit board assembly 632, regardless of the height of the seat post 600 mounted on frame 680.

The wire bundle 636 can either be routed out of a frame hole meant for stealth cable routing, or it can be routed out of one of the water bottle threaded inserts 681.

The wire bundle 636 is directly connected to the remote control 670, installed on handlebar 672.

A battery can be included inside of remote control 670, or in the electric wired valve actuation means 685, or anywhere in between.

Functionally, the embodiment of the invention 600 according to FIGS. 23-25 is preferred over the embodiments 10,300,400 of FIGS. 1-17 because a wire bundle can be routed along the bicycle frame in a way that is more hidden than a cable and housing. Functionally, embodiment 500 according to FIGS. 18-22 is preferred over embodiment 600 of FIGS. 23-25 and embodiments 10,300,400 of FIGS. 1-17 because it is wireless and does not require any wire or cable routing; installation is especially easy and there is no wire or cable housing to hide.

However, all embodiments 10,300,400,500,600 are superior to the prior art.

Furthermore, each embodiment 10,300,400,500,600 can be easily converted.

For example, embodiment 10 could be converted into embodiment 500 by simply replacing the valve actuation means 385 with 585.

The present invention has been described according to preferred embodiments, but equivalent variants can be devised without departing from the scope of protection offered by the following claims.

The invention claimed is:

1. An adjustable height seat post for being used in a bicycle comprising a frame including a saddle tube, a handlebar and a saddle including rails, said adjustable height seat post comprising:
   supporting means connectable to the bicycle frame,
   a quill associated with said supporting means and having a head suitable to clamp the rails of the saddle of a bicycle, in the desired position,
   hydraulic adjusting means, associated with said supporting means, for lifting or lowering said quill in a desired position selected by the user,
   said hydraulic adjusting means comprising a cylindrical chamber inside which a piston assembly is foreseen, and
   valve means, suitable to selectively open or close a hydraulic path through said piston assembly for selectively lock or unlock the position of said piston assembly relative to said cylindrical chamber,
   said valve means comprising at least a valve body, associated with said piston assembly, which is selectively rotatable from an open position, in which the hydraulic path through said piston assembly is open, to a closed position in which the hydraulic path through said piston assembly is closed,
   said hydraulic adjusting means comprising a valve cartridge assembly comprising a piston shaft connected to said piston assembly which, in use, is installed facing downwards and rigidly connected to said supporting means,
   said seat post further comprising valve actuation means associated with said supporting means and suitable to selectively rotate said valve body between said open position and said closed position, and
   wherein said valve actuation means comprise an actuation rod passing through an axial cavity of said piston shaft, and suitable to selectively rotate said valve body between said open position and said closed position.

2. The seat post according to claim 1, wherein said valve actuation means are associated with a lower end of said piston shaft and are suitable to convert a pulling action of an actuation cable in a rotation of said actuation rod, and therefore in a rotation of said valve body.

3. The seat post according to claim 2, wherein said valve actuation means comprise a twist cap, keyed to said actuation rod and housed inside a cable cap, said twist cap comprising an outer helix suitable to engage a corresponding inner helix of said cable cap, said twist cap being connected to an end of said actuation cable.

4. The seat post according to claim 3, wherein said valve actuation means comprise a spring interposed between a lower end, in use, of said twist cap and an internal surface of said cable cap, said spring being suitable to maintain said twist cap in an angular position corresponding to the closed position of said valve body.

5. The seat post according to claim 1, wherein said valve actuation means comprise a servo and circuit board assembly rigidly connected to an extremity of said actuation rod.

6. The seat post according to claim 5, wherein said servo and circuit board assembly is operatively connected to a remote control installed on the bicycle handlebar by means of a wireless communication.

7. The seat post according to claim 6, wherein said servo and circuit board assembly is rigidly connected to an extremity of said actuation rod by means of a connector, said servo and circuit board assembly being housed into a respective servo adapter.

8. The seat post according to claim 7, wherein said valve actuation means comprises a housing for a battery, associated with said servo adapter.

9. The seat post according to claim 5, for being used in a bicycle, wherein said servo and circuit board assembly is operatively connected to a remote control installed on the bicycle handlebar by means of a wired communication.

10. The seat post according to claim 9, for being used in a bicycle, wherein the bicycle frame includes a hole for stealth cable routing, and water bottle inserts, wherein said valve actuation means comprise a wire assembly comprising a connector, a coil and a flexible wire bundle connected to a remote control installed on the bicycle handlebar, said wire bundle being either routed out of the bicycle frame hole for stealth cable routing, or routed out of one of the water bottle inserts of said bicycle frame.

11. The seat post according to claim 1, wherein said piston assembly comprises a piston cap provided with respective piston holes, said valve body being substantially disc-shaped and being provided with respective valve holes which can be selectively aligned with said piston holes in order to open said hydraulic path and to achieve said open position of said valve means.

12. The seat post according to claim 1, wherein said piston assembly comprises a piston cap provided with first lateral holes, said valve body being substantially disc-shaped and provided with a front cavity and second lateral holes communicating with said front cavity, said valve body comprising a valve seal which, in use, is arranged in an axial position corresponding to that of said first lateral holes, said valve seal comprising respective flat areas suitable to selectively open or close said hydraulic path.

13. The seat post according to claim 1, wherein said piston assembly comprises a piston body comprising a head and a stem having lower diameter, said head comprising a front opening and lateral openings, said valve body comprising a threaded plug engaged in a passing axial channel of said piston body and having a threaded portion screwed in a nut of said passing axial channel, said valve body being rotatable in order to selectively open or close the hydraulic path constituted by said front opening and said lateral openings.

14. The seat post according to claim 1, wherein said hydraulic adjusting means comprises a floating piston defining a central hole through which said piston shaft is passing, said floating piston being suitable to delimit, with a lower body cap of said cylindrical chamber, a pressurized gas chamber inside said cylindrical chamber.

15. The seat post according to claim 1, wherein said supporting means comprise a tubular body which is suitable to be inserted inside the saddle tube of the bicycle frame.

16. The seat post according to claim 15, wherein said tubular body comprises a body cap to which said piston shaft is rigidly connected, said valve actuation means being connected to said body cap in a freely rotatable manner, in order to allow self-adjustment of said valve actuation means.

17. The seat post according to claim 1, wherein said cylindrical chamber comprises a top cap provided with a threaded hole for a central screw, suitable to secure, in use, said hydraulic adjusting means to said head.

* * * * *